US012455349B2

(12) United States Patent
Subburaj et al.

(10) Patent No.: US 12,455,349 B2
(45) Date of Patent: Oct. 28, 2025

(54) ESTIMATING AND COMPENSATING FOR CRYSTAL OSCILLATOR DIFFERENCES IN A MULTI-CRYSTAL-OSCILLATOR RADAR

(71) Applicant: TEXAS INSTRUMENTS INCORPORATED, Dallas, TX (US)

(72) Inventors: Karthik Subburaj, Bangalore (IN); Sandeep Rao, Bangalore (IN); Karthik Ramasubramanian, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 129 days.

(21) Appl. No.: 18/476,965

(22) Filed: Sep. 28, 2023

(65) Prior Publication Data
US 2025/0035744 A1  Jan. 30, 2025

(30) Foreign Application Priority Data
Jul. 27, 2023  (IN) .............................. 202341050665

(51) Int. Cl.
*G01S 7/40* (2006.01)
*G01S 7/35* (2006.01)
*G01S 13/931* (2020.01)

(52) U.S. Cl.
CPC ............ *G01S 7/4021* (2013.01); *G01S 7/356* (2021.05); *G01S 13/931* (2013.01)

(58) Field of Classification Search
None
See application file for complete search history.

(56) References Cited

U.S. PATENT DOCUMENTS

| 5,252,981 A | 10/1993 | Grein |
| 11,782,148 B2* | 10/2023 | Subburaj ................. G01S 7/352 |
| | | 342/109 |
| 2015/0009064 A1 | 1/2015 | Waldschmidt |
| 2021/0072349 A1* | 3/2021 | Mayer ..................... G01S 7/4017 |
| 2022/0209973 A1* | 6/2022 | Teng et al. .............. H04L 12/10 |
| 2023/0129011 A1* | 4/2023 | Lulu ....................... H04B 1/403 |
| | | 455/552.1 |
| 2025/0028041 A1* | 1/2025 | Meyer ..................... G01S 13/42 |
| 2025/0052885 A1* | 2/2025 | Wang ...................... G01S 7/354 |

FOREIGN PATENT DOCUMENTS

WO  2020198290 A1  10/2020

OTHER PUBLICATIONS

International Search Report for PCT/US2024/039678, dated Jan. 8, 2025, 6 pages.

\* cited by examiner

*Primary Examiner* — Curtis A Kuntz
*Assistant Examiner* — Jerold B Murphy
(74) *Attorney, Agent, or Firm* — Michael T. Gabrik; Frank D. Cimino

(57) ABSTRACT

In some examples, a method includes receiving, at a first device, a radar signal transmitted by a second device at a transmission frequency offset from a local oscillator (LO) frequency of the first device by a target offset and reflected off a target. The method also includes determining an intermediate frequency (IF) of the radar signal based on the transmission frequency and the LO frequency. The method also includes determining a parts per million (ppm) offset between the first device and the second device based on the intermediate frequency and the target offset.

20 Claims, 7 Drawing Sheets

ESTIMATING AND COMPENSATING FOR CRYSTAL OSCILLATOR DIFFERENCES IN A MULTI-CRYSTAL-OSCILLATOR RADAR

CROSS-REFERENCE TO RELATED APPLICATIONS

The present application claims priority to India Provisional Patent Application No. 202341050665, which was filed Jul. 27, 2023, is titled "ESTIMATING AND COMPENSATING FOR CRYSTAL OSCILLATOR DIFFERENCES IN A MULTI-CRYSTAL-OSCILLATOR RADAR," and is hereby incorporated herein by reference in its entirety.

BACKGROUND

In a radar system, one or more radar sensors may be used to detect obstacles around a device and/or the speeds of the detected objects relative to the device. The device may be a land, sea, or air-based vehicle, a robot, an unmanned vehicle, or the like. A processing unit in the radar system may determine an action to take (e.g., to avoid a collision, to reach a particular location, etc.) based on signals generated by the radar sensors. The processing unit may process the signals generated by the radar sensors. In some radar systems that include multiple sensors and multiple crystal oscillators (e.g., a multi-crystal-oscillator radar), differences may exist between frequencies of the crystal oscillators.

SUMMARY

In some examples, an apparatus includes a first oscillator and a receiver circuit. The receiver circuit includes a clock circuit, a mixer, a filter, an analog-to-digital converter, and a digital front end. The receiver circuit is configured to receive a first signal having a first frequency. The clock circuit is coupled to the first oscillator and configured to provide a local oscillator signal that has a second frequency based on the first frequency and a target offset. The mixer is coupled to receive the local oscillator signal and the first signal. The filter is coupled to the mixer and configured to provide an intermediate frequency signal based on the local oscillator signal and the first signal. The analog-to-digital converter is coupled to the filter and configured to provide a digitized intermediate frequency signal based on the intermediate frequency signal. The digital front end is coupled to the analog-to-digital converter configured to determine an intermediate frequency associated with the digitized intermediate frequency signal, and determine a variance between the first oscillator and a second oscillator based on a comparison of the intermediate frequency to the target offset.

In some examples, a method includes receiving, at a first device, a radar signal transmitted by a second device at a transmission frequency offset from a local oscillator (LO) frequency of the first device by a target offset and reflected off a target. The method also includes determining an intermediate frequency (IF) of the radar signal based on the transmission frequency and the LO frequency. The method also includes determining a parts per million (ppm) offset between the first device and the second device based on the intermediate frequency and the target offset.

In some examples, a system includes a first radar device and a second radar device. The first radar device is configured to transmit a frame of radar signals, each signal of the frame of radar signals increasing in frequency over time, wherein a starting frequency of each respective signal of the frame of radar signals beginning with a second signal of the frame of radar signals has a starting frequency offset by a frequency shift. The second radar device is configured to receive a frame of reflected signals, the frame of reflected signals corresponding to the frame of radar signals reflected off a target. The second radar device is also configured to sample the reflected signals in a set of sampling windows, each sampling window of the set of sampling windows corresponding to one respective reflected signal of the frame of reflected signals, wherein each successive sampling window of the set of sampling windows beginning with a second sampling window of the set of sampling windows is shifted in time by a time shift.

DETAILED DESCRIPTION

Figure 1:
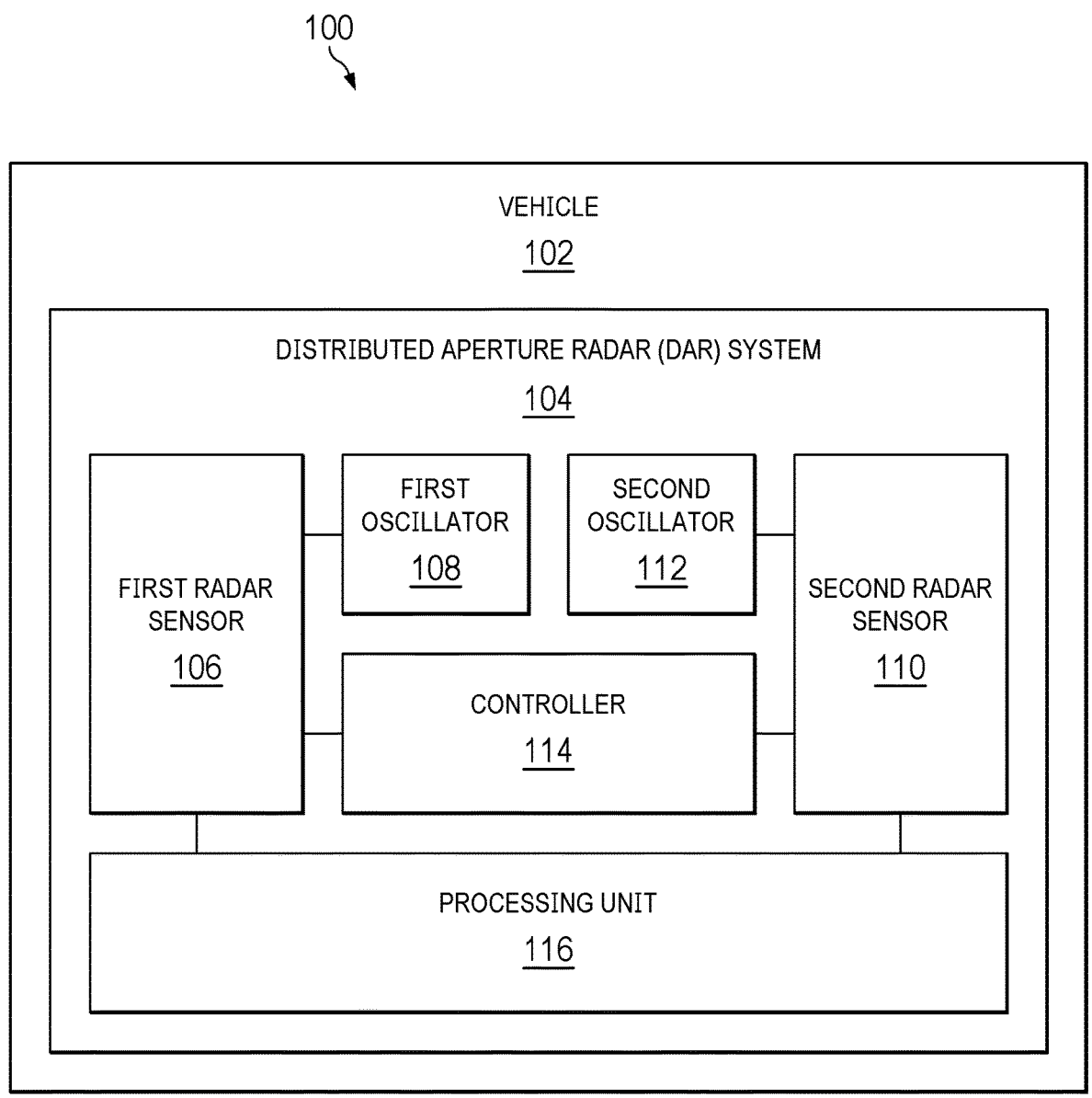
FIG. 1 is a block diagram of a system, in accordance with various examples

As described above, a processing unit may process the signals generated by the radar sensors. In some radar systems that include multiple sensors and multiple crystal oscillators (e.g., a multi-crystal-oscillator radar), differences may exist between frequencies of the crystal oscillators. For example, in a distributed aperture radar (DAR) system, multiple radar sensors are implemented facing in substantially a same direction. Each of the radar sensors may emit radar chirps and receive reflections of at least some of not only their own chirps, but also chirps emitted by the other radar sensor(s) in the DAR system. In this way, each of the radar sensors may have an increased or wider aperture, or angle of arrival (AoA) resolution. In some examples, increasing the AoA resolution enables the DAR system to distinguish between two closely-separated objects, whereas a decreased AoA resolution may report the two closely-separated objects as a single object. Each of the radar sensors may have, or be coupled, to its own oscillator. For example, the oscillator may be a crystal oscillator. In other examples, the oscillator may be any circuit which is a source of a clock signal. In some examples, the oscillators may age, drift, or otherwise lose precision over time, under certain operating circumstances, or the like. The loss in precision may vary from one oscillator to the next. As such, in a DAR system in which multiple radar sensors and multiple oscillators are used, challenges can arise in a first of the radar sensors accurately sampling received reflected chirps from a second of the radar sensors.

Examples of this description provide a technique for estimating and compensating, which may be collectively referred to as calibration, for intra-frame variation in radar chirps resulting from variance in an oscillator. In some examples, the estimating is performed at a first radar sensor with respect to chirps transmitted by a second radar sensor, and the compensating is implemented at the first radar sensor. In other examples, the compensating is performed at the first and the second radar sensors. In some examples, the radar sensors are each a radar system-on-a-chip (SOC), such as a radar transceiver integrated circuit. The estimating and compensating may be performed in an application environment (e.g., vehicle, robot, etc.) of the radar sensors on the fly (e.g., responsive to the DAR system being activated or the occurrence of a trigger event), periodically, or according to any other suitable schedule.

In some examples, the second radar sensor may emit a series of zero slope (e.g., constant frequency) chirps in a stepped pattern for a programmed amount of time or a programmed number of chirps. The first radar sensor may receive reflections of the chirps while operating at a frequency offset by a target offset amount from the zero slope chirps. The first radar sensor may process the reflected chirps to determine whether a calculated intermediate frequency of the chirps varies from the target offset amount. Responsive to determining that the intermediate frequency of the chirps does not vary from the target offset amount, or varies less than a threshold amount, the first radar sensor determines that frequencies of oscillators of the first and second radar sensors are matched. Responsive to determining that the intermediate frequency of the chirps varies from the target offset amount, or varies greater than a threshold amount, the first radar sensor determines that frequencies of oscillators of the first and second radar sensors are not matched. Responsive to determining that frequencies of oscillators of the first and second radar sensors are not matched, the first radar sensor may perform one or more mitigating actions. For example, the first radar sensor may modify timing of a sampling component (such as an analog-to-digital converter (ADC) of the first radar sensor). In another example, the second radar sensor may modify a frequency of transmission of chirps in the DAR system. In some examples, the modification may be on a per frame basis, where each sensor transmits multiple frames of chirps, each frame being spaced apart in time by a first programmed time. In other examples, the modification may be on a per chirp basis, where each frame includes a number of chirps, each chirp being spaced apart in time by a second programmed time. In some examples, each frame includes about 256 chirps. In other examples, the frames may include any other suitable number of chirps.

FIG. 1 is a block diagram of a system 100, in accordance with various examples. In an example, the system 100 includes a vehicle 102, and a DAR system 104. The DAR system 104 includes a first radar sensor 106, a first oscillator 108, a second radar sensor 110, a second oscillator 112, and a controller 114. The first radar sensor 106 is coupled to the first oscillator 108 and the controller 114. The second radar sensor 110 is coupled to the second oscillator 112 and the controller 114.

In an example, the controller 114 transmits trigger signals to the first radar sensor 106 and the second radar sensor 110 to cause the first radar sensor 106 and the second radar sensor 110 to each transmit a frame of chirps. In some examples, the controller 114 is, or includes, an Ethernet host, such that the trigger signals are Ethernet precision time protocol (PTP) signals that compensate for inter-frame errors, such as frame-to-frame periodicity. While in a calibration mode, the chirps may be zero slope (e.g., constant frequency) chirps. In some examples, each chirp has a frequency that is different (e.g., greater) than a frequency of a preceding chirp in the frame by a programmed step amount. The calibration is described herein from a perspective of the first radar sensor 106 with respect to the second radar sensor 110. However, the described calibration may be similarly applicable from a perspective of the second radar sensor 110 with respect to the first radar sensor 106. In some examples, the calibration is performed at predetermined or programmed times. For example, the calibration may be performed at the beginning of a power cycle of the DAR system 104 (or any of its sub-components), and/or at programmed times thereafter. In some examples, the first radar sensor 106 and the second radar sensor 110 may communicate via the controller 114 to initiate or otherwise coordinate the calibration. In some examples, the controller 114 triggers the first radar sensor 106 and the second radar sensor 110 to perform the calibration.

Figure 2:
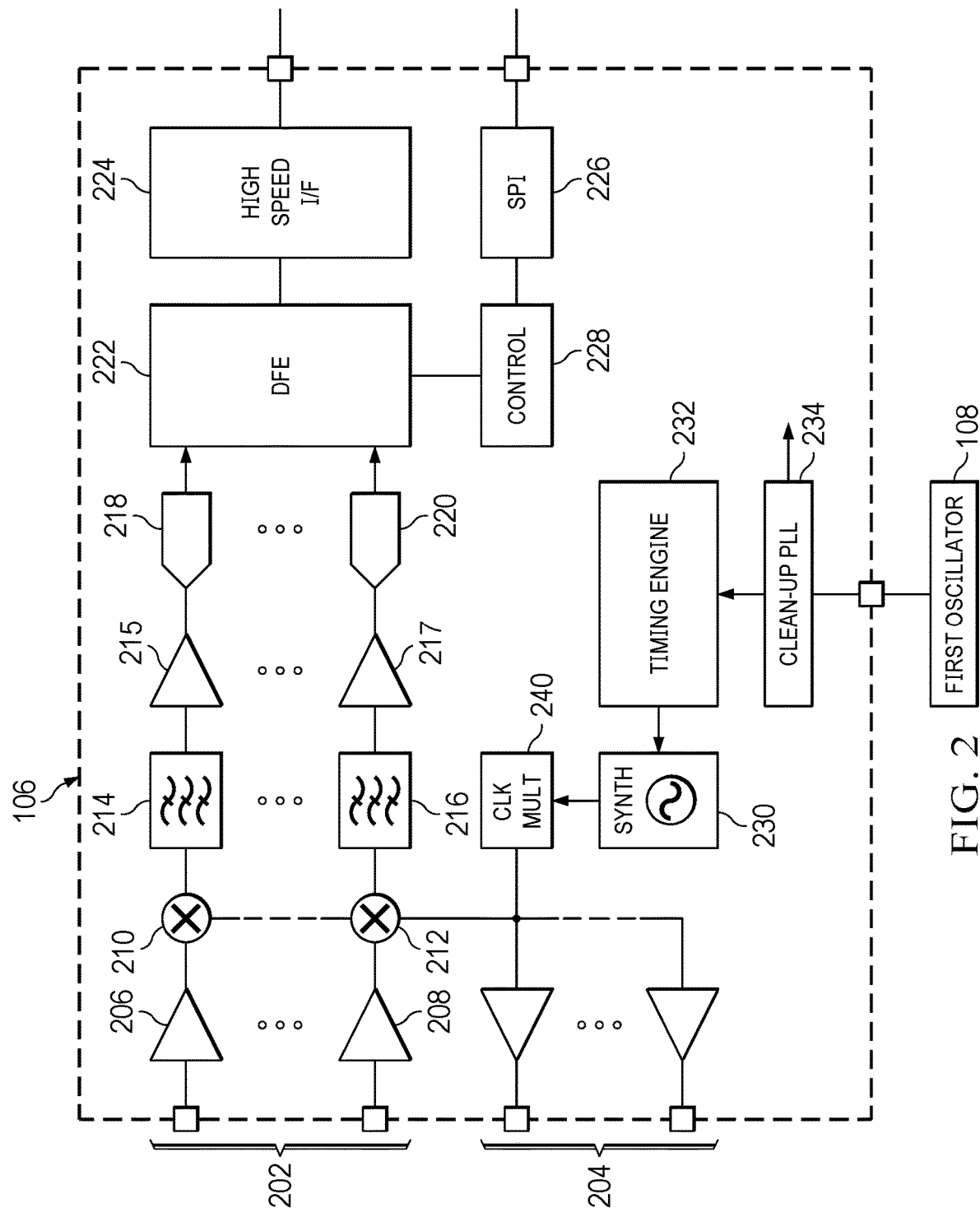
FIG. 2 is a block diagram of a radar sensor, in accordance with various examples.

As is explained in more detail in reference to FIG. 2, the first radar sensor 106 includes functionality to generate multiple digital intermediate frequency (IF) signals (which may be referred as de-chirped signals, beat signals, or raw radar signals) based on received radar signals. In some examples, these intermediate frequency signals are provided to a processing unit 116 via a high-speed serial interface (not shown). In other examples, the intermediate frequency signals are processed by the first radar sensor 106, such as to estimate variance in frequency of the first oscillator 108 and the second oscillator 112, determine a compensation value for the estimated variance, and/or control one or more components (not shown) of the first radar sensor 106 to implement compensation based on the determined compensation value.

The processing unit 116 includes circuitry suitable for performing radar signal processing, such as processing the intermediate frequency signals to determine, for example, distance, velocity, and angle of detected objects. The processing unit 116 may also include functionality to perform post processing of the information about the detected objects, such as tracking objects, determining rate and direction of movement, etc. The processing unit 116 may include any suitable processor or combination of processors for processing the intermediate frequency signals. For example, the processing unit 116 may include a digital signal processor (DSP), a microcontroller (MCU), an SOC combining both DSP and MCU processing, or a field programmable gate array (FPGA) and a DSP.

Based on the processing of the intermediate frequency signals, the processing unit 116 provides control information to one or more electronic control units (not shown) in the vehicle 102. Electronic control unit (ECU) may refer to any embedded system in a vehicle that controls one or more electrical systems or subsystems in the vehicle. Types of ECUs include, for example, electronic/engine control module (ECM), power train control module (PCM), transmission control module (TCM), brake control module (BCM or EBCM), central control module (CCM), central timing module (CTM), general electronic module (GEM), body control module (BCM), and suspension control module (SCM).

FIG. 2 is a block diagram of the first radar sensor 106, in accordance with various examples. The first radar sensor 106 may include multiple transmit channels 204 for transmitting frequency modulated continuous wave (FMCW) signals and multiple receive channels 202 for receiving the reflected transmitted signals Further, the number of receive channels 202 may be larger than the number of transmit channels 204. For example, an embodiment of the first radar sensor 106 may have two transmit channels 204 and four receive channels 202.

A transmit channel 204 includes a transmitter (not shown) and an antenna (not shown). A receive channel 202 includes a receiver (not shown) and an antenna (not shown). Each of the receive channels 202 may be substantially identical and include a low-noise amplifier (LNA) 206, 208 to amplify the received signal, a mixer 210, 212 to mix the signal generated by the transmission generation circuitry with the received signal to generate an intermediate frequency signal, a baseband bandpass filter 214, 216 for filtering the intermediate frequency signal, a variable gain amplifier (VGA) 215, 217 for amplifying the filtered intermediate frequency signal, and an ADC 218, 220 for converting the analog intermediate frequency signal to a digital intermediate frequency signal. The mixer 210, 212 functions as a down converter that provides an output signal with a frequency equal to the difference between the frequency of the inputs received from the low-noise amplifier 206, 208 and the transmission generation circuitry, both of which are radio frequency (RF) signals. The bandpass filter 214, 216, VGA 215, 217, and ADC 218, 220 of a receive channel may be collectively referred to as a baseband chain or baseband filter chain. Further, the bandpass filter 214, 216 and VGA 215, 217 may be collectively referred to as an intermediate frequency amplifier (IFA).

The receive channels 202 are coupled to the digital front end (DFE) component 222 to provide the digital intermediate frequency signals to the DFE 222. The DFE 222 includes functionality to perform decimation filtering on the digital intermediate frequency signals to reduce the data transfer rate. The DFE 222 may also perform other operations on the digital intermediate frequency signals. For example, the DFE 222 may perform direct current (DC) offset removal, digital compensation of non-idealities in the receive channels 202, such as inter-receiver gain imbalance non-ideality, inter-receiver phase imbalance non-ideality, and the like. The DFE 222 is coupled to the high-speed serial interface (I/F) 224 to transfer decimated digital intermediate frequency signals to the processing unit 116 when the first radar sensor 106 is in normal mode. In some embodiments, the DFE 222 is also coupled to the control module 228 to transfer digital intermediate frequency signals to the control module 228, such as for use by the control module 228 to estimate variance in frequency of the first oscillator 108 and the second oscillator 112, determine a compensation value for the estimated variance, and/or control one or more components (such as the timing engine 232 or radio frequency synthesizer (SYNTH) 230 and/or the ADC 218, 220) of the first radar sensor 106 to implement compensation based on the determined compensation value.

The serial peripheral interface (SPI) 226 provides an interface for communication with the processing unit 116. For example, the processing unit 116 may use the SPI 226 to send control information, such as timing and frequencies of chirps, output power level, triggering of monitoring functions, etc., to the control module 228. The first radar sensor 106 may use the SPI 226, for example, to send calibration data to the processing unit 116, such as estimated variance and/or the compensation value.

The control module 228 includes functionality to control the operation of the first radar sensor 106 in a normal operation mode and in calibration mode. The control module 228 may include, for example, a buffer (not shown) to store data from the DFE 222, a fast Fourier transform (FFT) circuit (not shown) to compute spectral information of the buffer contents, and an MCU (not shown) that executes code (in the form of firmware and/or software) to control the operation of the first radar sensor 106 in the normal operation mode and in calibration mode. Operation of the control module 228 in the calibration mode is described in more detail below, such as in determining the estimated variance and/or the compensation value.

The programmable timing engine 232 includes functionality to receive chirp parameter values for a sequence of chirps in a radar frame from the control module 228 and to generate chirp control signals that control the transmission and reception of the chirps in a frame based on the parameter values. The chirp parameters are defined by the radar system architecture and may include, for example, a transmitter enable parameter for indicating which transmit channels 204 to enable, a chirp frequency start value, a chirp frequency slope, a chirp duration, a chirp quantity, a compensation value such as a chirp frequency offset (e.g., $\Delta F$), indicators of when the transmit channels 204 should transmit and when an output signal of the DFE 222 should be collected for further radar processing, etc. One or more of these parameters may be programmable.

The radio frequency synthesizer (SYNTH) 230 includes functionality to generate frequency modulated continuous wave (FMCW) signals for transmission based on chirp control signals from the timing engine 232. In some examples, the SYNTH 230 includes a phase locked loop (PLL) (not shown) with a voltage-controlled oscillator (VCO) (not shown).

The clock multiplier 240 increases the frequency of the transmission signal to a local oscillator (LO) frequency of the mixers 210, 212. The clean-up PLL 234 operates to increase the frequency of a reference clock received from the first oscillator 108 to the frequency of the SYNTH 230 and to filter phase noise resulting from the reference clock out of the clock signal. In some examples, the clock multiplier 240 may be omitted, such as in examples in which the FMCW signals provided by the SYNTH 230 are at the LO frequency.

The clock multiplier 240, SYNTH 230, timing engine 232, and clean-up PLL 234 are an example of transmission generation circuitry. The transmission generation circuitry generates a radio frequency (RF) signal as input to the transmit channels 204 and as input to the mixers 210, 212 in the receive channels 202 via the clock multiplier 240 (or SYNTH 230). The output of the transmission generation circuitry may be referred to as the transmission signal, the LO signal, or the FMCW signal.

Figure 3:
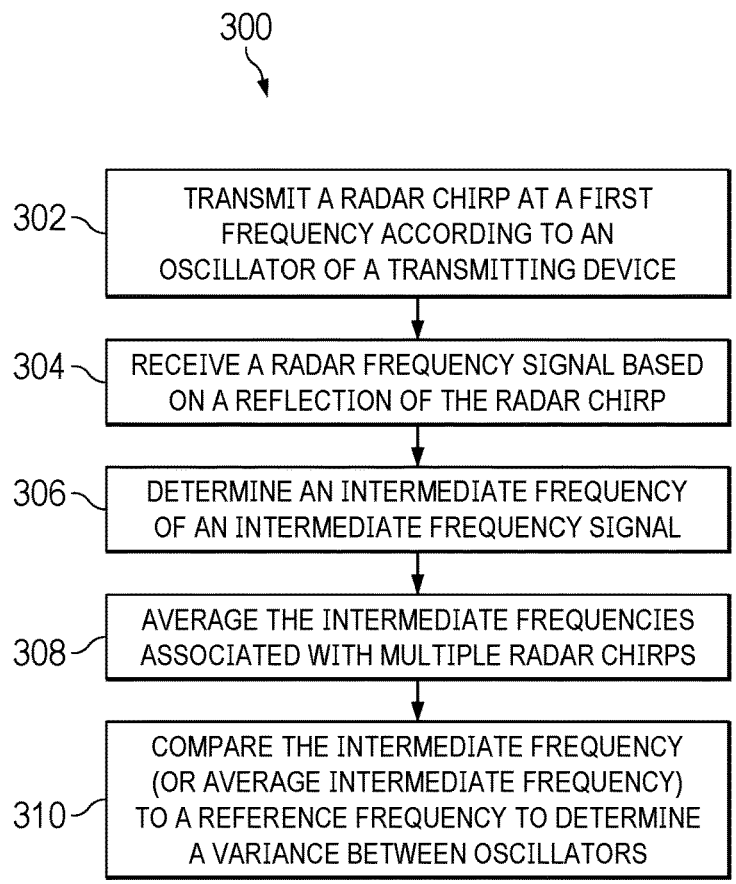
FIG. 3 is a flowchart of a method of estimating a variance between oscillators, in accordance with various examples.

FIG. 3 is a flowchart of a method 300 of estimating a variance between oscillators, in accordance with various examples. In some examples, the method 300 is implemented by the first radar sensor 106, such as by the control module 228, to determine a variance or frequency difference between the first oscillator 108 and the second oscillator 112. In some examples, the variance or frequency difference is represented in terms of parts per million (ppm), where 1 ppm is approximately equal to $\frac{1}{10^6}$ part, or 0.0001%, of a nominal frequency of the oscillator. For example, for a 40-megahertz (MHz) signal, 1 ppm is approximately equal to 40 hertz (Hz). Thus, a 1 ppm variance or frequency difference between the first oscillator 108 and the second oscillator 112 would indicate that frequencies of the first oscillator 108 and the second oscillator 112 vary by 40 Hz.

At operation 302, a radar chirp is transmitted at a first frequency according to an oscillator of a transmitting device.

In an example, the second radar sensor 110 transmits the radar chirp at the first frequency (e.g., about 77 GHZ), based at least in part on a frequency of an oscillator circuit, such as the second oscillator 112, coupled to the second radar sensor 110.

Figure 5:
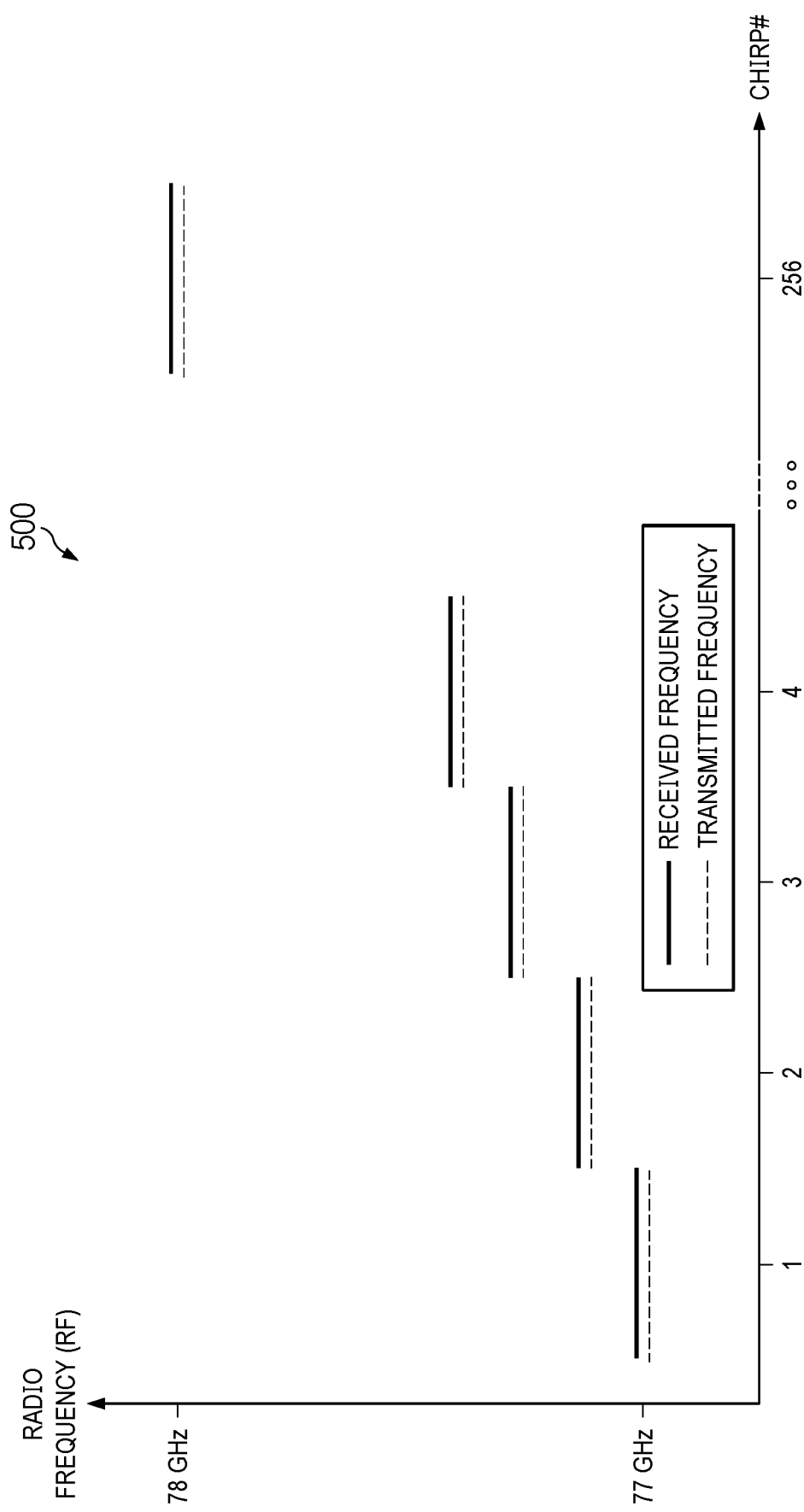
FIG. 5 is an example timing diagram of transmitted radar chirps and received radar chirps.

In some examples, a plurality of radar chirps is transmitted, such as in one frame, or in multiple frames. The chirps may be zero slope chirps, such that each chirp has a constant frequency (e.g., the individual chirps do not ramp or increase in value). In some examples, the transmission frequency and the reception or sampling frequency increase from chirp to chirp in a stepping pattern. For example, a first chirp is transmitted at frequency X and received at frequency Y, where Y equals X plus an offset. A second chirp is transmitted at frequency X+A and received at frequency Y+A. A third chirp is transmitted at frequency X+2A and received at frequency Y+2A. An nth chirp is transmitted at frequency X+nA and received at frequency Y+nA. An example of the chirp frequencies is shown in FIG. 5. FIG. 5 is an example timing diagram 500 of transmitted radar chirps and received radar chirps, as described herein, such as described with respect to operation 302. The timing diagram 500 includes a vertical axis representative of frequency and a horizontal axis representative of a number of approximately equal duration chirps. As shown in FIG. 5, the chirps may step up from 77 GHZ to 78 GHZ in increments or steps of 1/256 GHz. In other examples, any suitable frequency range and step size may be used.

In some examples, using multiple chirps at multiple frequencies may mitigate adverse effects of interference on the estimation performed in the method 300, prevent emissions specification violations of standards according to which the DAR system 104 is operating, and/or build a signal-to-noise ratio (SNR) in low-reflection scenarios.

Returning to FIG. 3, at operation 304, the first radar sensor 106 receives a radar frequency signal based on a reflection of the radar chirp(s), and produces an intermediate frequency signal based on the radar frequency signal. In an example, a first oscillator 108 and/or a clock multiplier 240 of the first radar sensor 106 generate a local oscillator signal having a second frequency that is offset from the first frequency by a target offset amount and filtering the result. In an example, the target offset amount is 10 MHZ, and the second frequency is 77 GHZ+10 MHZ, relative to the oscillator circuit of the receiving device. However, as the oscillator circuit of the transmitting device and the oscillator circuit of the receiving device may not be perfectly synchronized, the difference between the first frequency and the second frequency may be greater than or less than the target offset amount. The variance may be determined and resolved in the steps that follow.

Continuing the example, a mixer 210 of the first radar sensor 106 may mix the local oscillator signal with the radar frequency signal, and a filter of the first radar sensor 106 may filter the resulting signal to produce the intermediate frequency signal.

At operation 306, an intermediate frequency of the intermediate frequency signal is determined. In an example, an ADC 218 of the first radar sensor 106 digitizes the intermediate frequency signal, and the conversion may performed by sampling at the second frequency. The intermediate frequency may be determined by a DFE of 222 of the first radar sensor 106 by performing an FFT on the digitized intermediate frequency signal.

Figure 6:
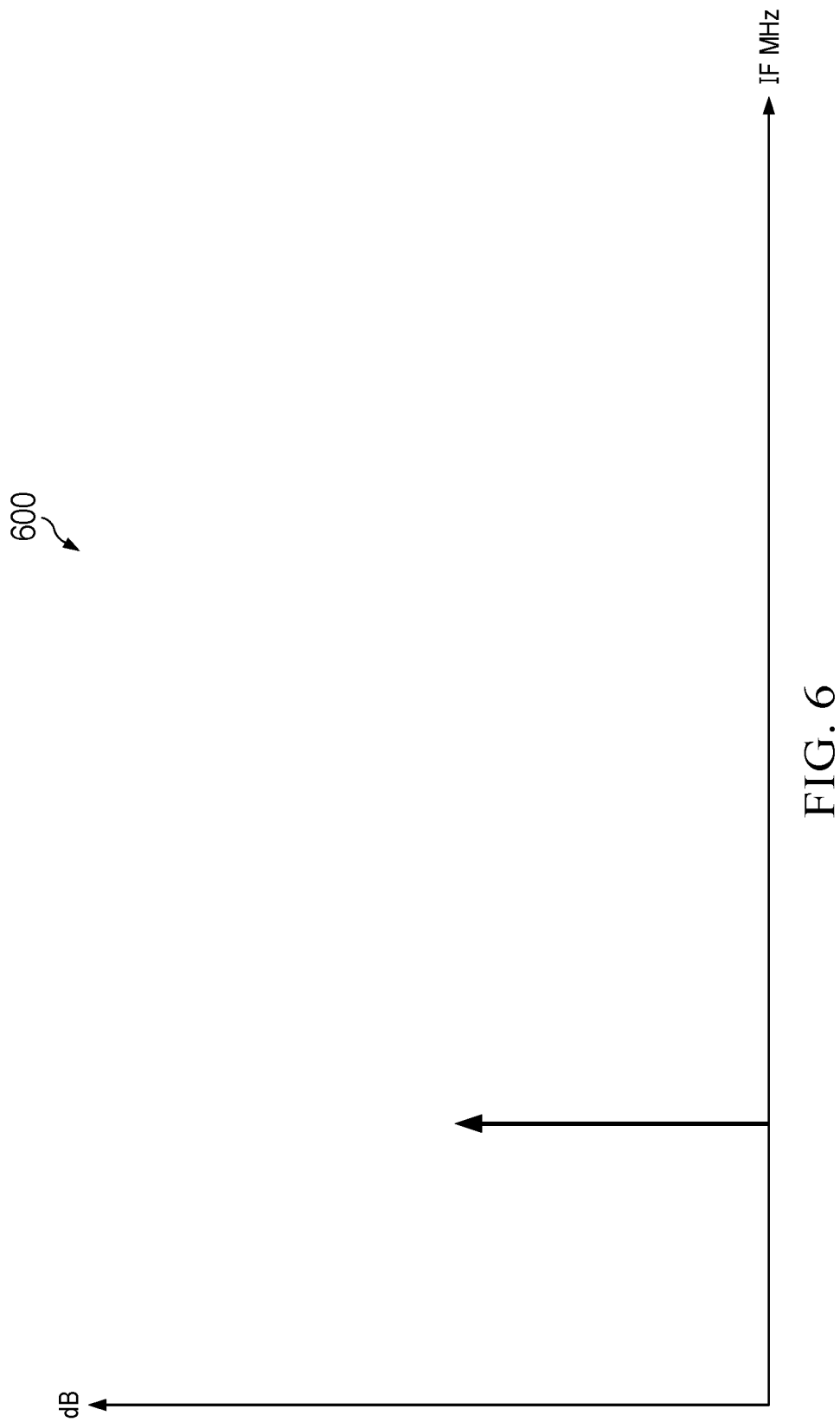
FIG. 6 is an example timing diagram of an averaged intermediate frequency (IF) signal.

In examples with more than one chirp, the intermediate frequencies associated with each chirp is averaged at operation 308. In some examples, the averaging is a non-coherent averaging. For example, the averaging may not include any correspondence between individual digital representations of the radar chirps and phase information of the radar chirps. A result of the averaging is shown in FIG. 6. FIG. 6 is an example timing diagram 600 of the averaged intermediate frequency signal. The timing diagram 600 is shown having a horizontal axis representative of frequency in units of MHz and a vertical axis representative of an intensity, shown in FIG. 6 in units of decibels (dB).

Returning to FIG. 3, at operation 310, the intermediate frequency (or average intermediate frequency) is compared to a reference frequency (e.g., the target offset amount above) to determine the variance between oscillators. For example, a frequency indicated by a pulse or peak in the timing diagram 600 may be determined as the intermediate frequency. In some examples, the reference frequency is the target offset frequency between the first frequency and the second frequency (e.g., 10 MHz in the example above). In some examples, a variance between the intermediate frequency and the reference frequency indicates the variance between oscillators in units of Hz, which may be convertible to ppm, as described above. Generally, the variance may be determined in ppm according to 1e6 multiplied by a difference of the frequency representation of the averaged intermediate frequency signal and the non-zero offset amount, divided by the first frequency (e.g., ppm=1e6*($F_{IF}$-$F_{offset}$)/$F_{RF}$, where $F_{IF}$ is the peak frequency of the averaged intermediate frequency. $F_{offset}$ is the non-zero offset amount, and $F_{RF}$ is the first frequency). In some examples, $F_{RF}$ may instead be an average of multiple frequencies across which multiple intermediate frequency are determined and averaged to form $F_{IF}$.

In some examples, each of the received radar chirps may have a length or duration of about 100 microseconds (us). The 100 us duration corresponds to a 10 KHz bin resolution. For example, FFT bins determined at operation 306 are separated by 1/100 us, or 10 KHz. Thus, the peak in the timing diagram 600 determined at operation 310 is determinable only in 10 KHz steps. However, by picking a few FFT output points around the highest magnitude FFT bin, and performing curve-fitting to a quadratic graph (e.g., quadratic interpolation), accuracy of the estimated peak with <10 KHz step size or residual error may be determined. In some examples, this estimated peak size may be used in determining ppm in place of the averaged intermediate frequency signal.

In some examples, operations 302-310 may also be performed by the second radar sensor 110 in a manner substantially similar to that described above with respect to the first radar sensor 106. In an example, the individual variances determined by the first radar sensor 106 and the second radar sensor 110 may be accuracy limited by Doppler induced ppm shifts between the first radar sensor 106 and the second radar sensor 110. By averaging the variances determined by the first radar sensor 106 and the second radar sensor 110, effects of the Doppler induced ppm shifts on the determined variance may be mitigated. In some examples, method 300 may be performed periodically and the determined variance may be tracked, such as to determine a correspondence to temperature or other environmental or operational characteristics.

Figure 4:
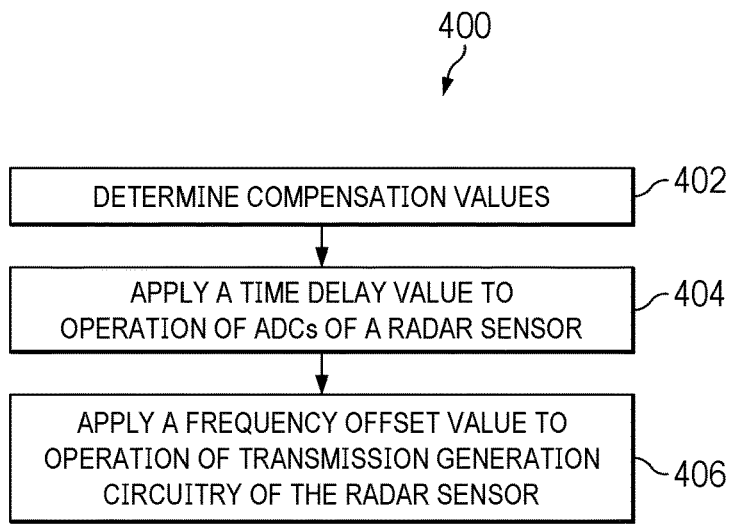
FIG. 4 is a flowchart of a method of compensating for a variance between oscillators, in accordance with various examples.

FIG. 4 is a flowchart of a method 400 of compensating for a variance between oscillators, in accordance with various examples. In some examples, the method 400 is implemented by the first radar sensor 106, such as by the control module 228, to compensate for a variance or frequency difference between the first oscillator 108 and the second oscillator 112. In some examples, the variance compensated for by the method 400 is determined according to the method 300, as described above. As such, in some examples, a single device performs at least some of the method 300 and the method 400.

At operation 402, compensation values are determined. In an example, the control module 228 determines the compensation values. The compensation values may be determined based on the variance determined above according to the method 300. In some examples, the compensation values include a ΔD value and a ΔF value. The ΔD value may be a time delay value and the ΔF value may be a frequency offset value. The ΔD value may be determined to compensate for time-based errors in the DAR system 104 introduced by the variance or frequency difference between the first oscillator 108 and the second oscillator 112. The ΔF value may be determined to compensate for frequency-based errors in the DAR system 104 introduced by the variance or frequency difference between the first oscillator 108 and the second oscillator 112. In some examples, ΔD is determined according to: $\Delta D = ppm*1e-6*P_{signal}$, where $P_{signal}$ is a signal repetition period of a set of radar signal reflections. In some examples, ΔF is determined according to: $F=\Delta D*S$, where S is a system parameter representing a slope of a FMCW chirp used during normal operation.

At operation 404, the ΔD value is applied to operation of ADCs of the first radar sensor 106. In some examples, the control module 228 applies ΔD to the ADC 218, 220. By applying ΔD to the ADCs of the first radar sensor 106, a sampling period of the ADCs is delayed by ΔD. In some examples, ΔD is applied on a per chirp basis. For example, for a first chirp, the control module 228 applies a delay of ΔD to the ADCs. For a second chirp, the control module 228 applies a delay of 2*ΔD to the ADCs. For a third chirp, the control module 228 applies a delay of 3*ΔD to the ADCs. For an nth chirp, the control module 228 applies a delay of n*ΔD to the ADCs. An example of the delaying is shown in FIG. 7.

Figure 7:
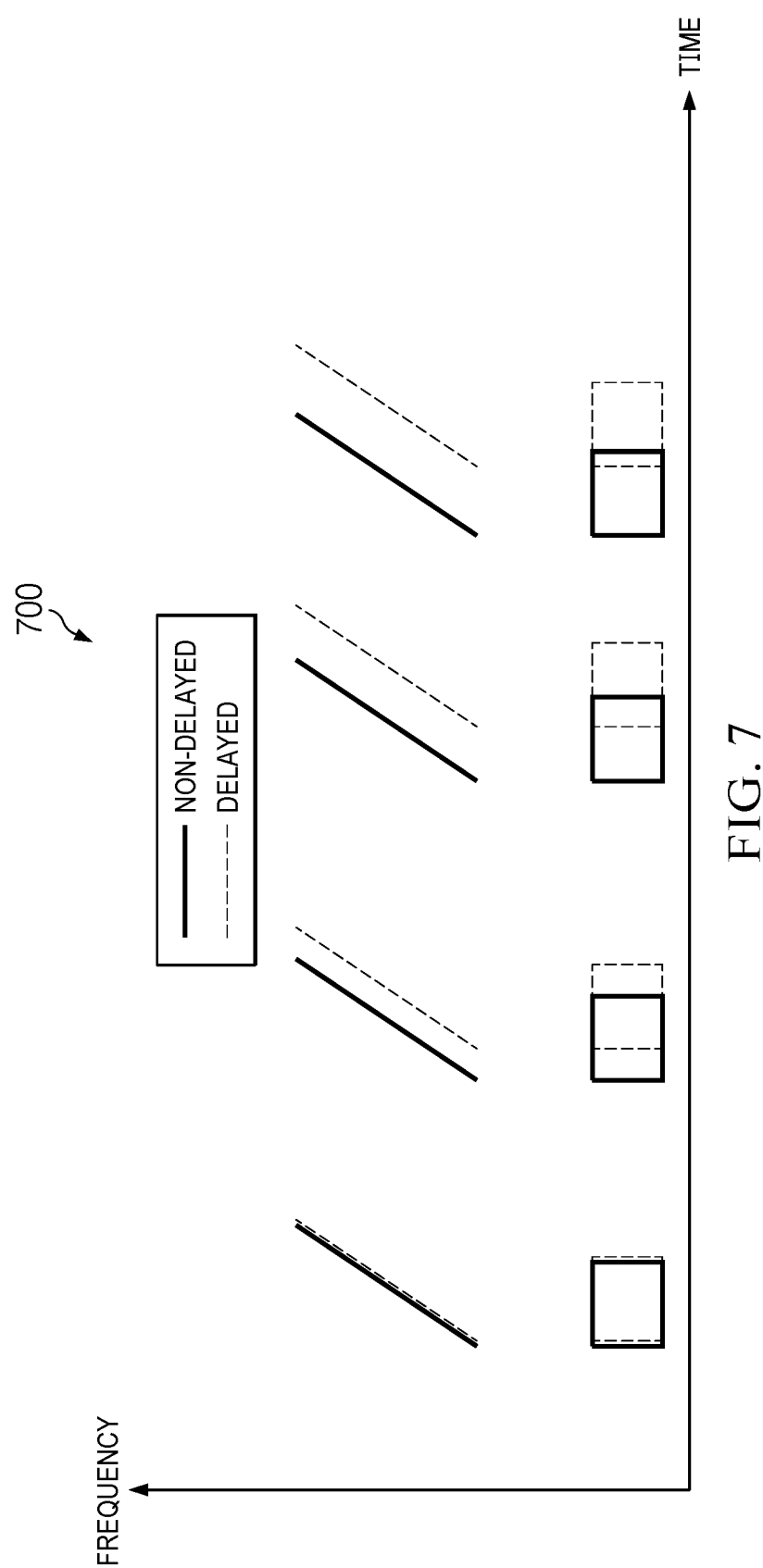
FIG. 7 is an example timing diagram of delayed and non-delayed chirps, and delayed and non-delayed analog-to-digital converter (ADC) sampling periods.

FIG. 7 is an example timing diagram 700 of delayed and non-delayed chirps, and delayed and non-delayed ADC sampling periods. The non-delayed chirps are chirps that are ideal in nature. For example, the ideal chirps do not suffer from variance in the second oscillator 112 from an ideal frequency. However, in practice, the delayed chirps are received by the first radar sensor 106. As can be seen in FIG. 7, the non-delayed ADC sampling periods may provide limited sampling opportunities for at least some delayed chirps, and may provide no sampling opportunities for some delayed chirps. As such, by delaying the ADC sampling periods by ΔD on a per chirp basis, the ADC sampling periods are approximately aligned in time with receipt of the delayed chirps, increasing performance of the first radar sensor 106.

Returning to FIG. 4, at operation 406, the ΔF value is applied to operation of transmission generation circuitry of the first radar sensor 106. In some examples, the control module 228 applies ΔF to the timing engine 232. By applying ΔF to the timing engine 232 of the first radar sensor 106, the range of transmission frequencies for a given chirp produced by the first radar sensor 106 is modified. In some examples, ΔF is applied on a per chirp basis. For example, for a first chirp, the control module 228 applies a frequency offset of ΔF to the timing engine 232. For a second chirp, the control module 228 applies a frequency offset of 2*ΔF to the timing engine 232. For a third chirp, the control module 228 applies a frequency offset of 3*ΔF to the timing engine 232. For an nth chirp, the control module 228 applies a frequency offset of n*ΔF to the timing engine 232. An example of the frequency offset is shown in FIG. 8.

Figure 8:
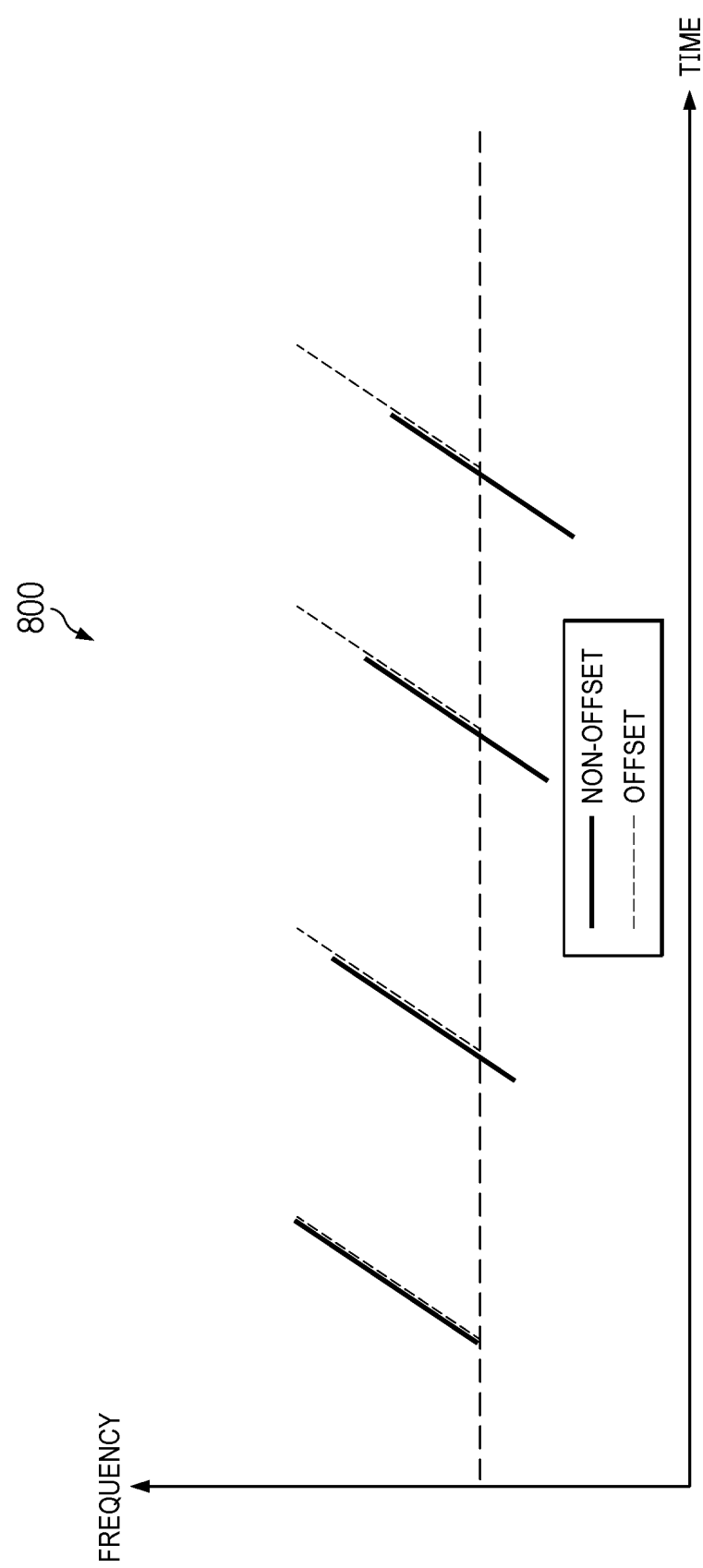
FIG. 8 is an example timing diagram of offset and non-offset chirps.

FIG. 8 is an example timing diagram 800 of offset and non-offset chirps. As can be seen in FIG. 8, a starting frequency, and therefore also an ending frequency, of a chirp may decrease with time, or more generally may appear, based on discrepancies between the oscillators of the transmitter and the receiver. As such, by applying a frequency offset of ΔF to the transmitted chirps on a per chirp basis, the starting frequencies and ending frequencies of the chirps remain approximately consistent from the perspective of the receiver, increasing performance of the first radar sensor 106.

In this description, the term "couple" may cover connections, communications, or signal paths that enable a functional relationship consistent with this description. For example, intermediate frequency device A generates a signal to control device B to perform an action: (a) in a first example, device A is coupled to device B by direct connection; or (b) in a second example, device A is coupled to device B through intervening component C intermediate frequency intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
    a first oscillator;
    a receiver circuit configured to receive a first signal having a first frequency, wherein the receiver circuit includes:
        a clock circuit coupled to the first oscillator and configured to provide a local oscillator signal that has a second frequency based on the first frequency and a target offset;
        a mixer coupled to receive the local oscillator signal and the first signal;
        a filter coupled to the mixer and configured to provide an intermediate frequency signal based on the local oscillator signal and the first signal;
        an analog-to-digital converter coupled to the filter and configured to provide a digitized intermediate frequency signal based on the intermediate frequency signal; and
        a digital front end coupled to the analog-to-digital converter configured to:
            determine an intermediate frequency associated with the digitized intermediate frequency signal; and
            determine a variance between the first oscillator and a second oscillator based on a comparison of the intermediate frequency to the target offset.

2. The apparatus of claim 1, wherein the digital front end is configured to determine the variance as a parts per million (ppm) offset according to: $1e6*(F_{IF}-F_{offset})/F_{RF}$, where $F_{IF}$ is a peak frequency of intermediate frequency, $F_{offset}$ is the target offset, and $F_{RF}$ is the first frequency.

3. The apparatus of claim 1, wherein:
    the receiver is configured to receive a second signal at a third frequency;
    the clock circuit is configured to provide a second local oscillator signal that has a fourth frequency based on the second frequency and the target offset;
    the filter is configured to provide a second intermediate frequency signal based on the second local oscillator signal and the second signal;
    the analog-to-digital converter is configured to provide a second digitized intermediate frequency signal based on the second intermediate frequency signal; and
    the digital front end is configured to:
        determine a second intermediate frequency associated with the second digitized intermediate frequency signal;
        average the intermediate frequency and the second intermediate frequency to determine an average intermediate frequency; and
        determine the variance between the first oscillator and the second oscillator based on a comparison of the average intermediate frequency to the target offset.

4. The apparatus of claim 3, wherein the digital front end is configured to determine the variance as a parts per million (ppm) offset according to: $1e6*(F_{IF}-F_{offset})/F_{RF}$, where $F_{IF}$ is a peak frequency of the average intermediate frequency, $F_{offset}$ is the target offset, and $F_{RF}$ is an average of the first frequency and the third frequency.

5. The apparatus of claim 1, wherein:
    the receiver is configured to receive a set of radar signals;
    the analog-to-digital converter is configured to perform sampling, in a set of sampling windows, each sampling window corresponding to a respective one of the set of radar signals; and
    offset a time shift to each successive sampling window of the set of sampling windows beginning with a second sampling window of the set of sampling windows.

6. The apparatus of claim 5, wherein the digital front end is configured to determine the time shift (ΔD) according to: $\Delta D = ppm*1e-6*P_{signal}$, where $P_{signal}$ is a signal repetition period of the set of radar signals.

7. The apparatus of claim 6, wherein each radar signal of the set of radar signals increases in frequency over time, and wherein a starting frequency of each successive radar signal of the set of radar signals beginning with a second radar signal of the set of radar signals is offset by a frequency shift (ΔF).

8. The apparatus of claim 7, wherein the frequency shift (ΔF) is determined according to: $F=\Delta D*S$, where S is a system parameter representing a slope of a respective radar signal of the set of radar signals.

9. A method, comprising:
    receiving, at a first device, a radar signal transmitted by a second device at a transmission frequency offset from a local oscillator (LO) frequency of the first device by a target offset and reflected off a target;
    determining an intermediate frequency (IF) of the radar signal based on the transmission frequency and the LO frequency; and
    determining a parts per million (ppm) offset between the first device and the second device based on the intermediate frequency and the target offset.

10. The method of claim 9, further comprising determining the ppm offset according to: $1e6*(F_{IF}-F_{offset})/F_{RF}$, where $F_{IF}$ is a peak frequency of the intermediate frequency, $F_{offset}$ is the target offset, and $F_{RF}$ is the transmission frequency.

11. The method of claim 9, further comprising:
    receiving, at the first device, a second radar signal transmitted by the second device at a second transmission frequency offset from a second LO frequency of the first device by the target offset and reflected off the target;
    determining a second intermediate frequency of the radar signal based on the second transmission frequency and the second LO frequency;
    averaging the intermediate frequency and second intermediate frequency to determine an average intermediate frequency; and
    determining the ppm offset between the first device and the second device based on the average intermediate frequency and the target offset.

12. The method of claim 11, further comprising determining the ppm offset according to: $1e6*(F_{IF}-F_{offset})/F_{RF}$, where $F_{IF}$ is a peak frequency of the average intermediate frequency, $F_{offset}$ is the target offset, and $F_{RF}$ is an average of the transmission frequency and the second transmission frequency.

13. The method of claim 9, further comprising:
    receiving, at the first device, a frame of radar signals transmitted by the second device and reflected off a second target; and sampling, in a set of sampling windows the frame of radar signals, each sampling window corresponding to a respective signal of the frame of radar signals,
wherein each successive sampling window of the set of sampling windows beginning with a second sampling window of the set of sampling windows is shifted in time by a time shift ($\Delta D$).

14. The method of claim 13, wherein the time shift ($\Delta D$) is: $\Delta D = ppm*1e-6*P_{signal}$, where $P_{signal}$ is a signal repetition period of the frame of radar signals.

15. The method of claim 14, wherein each signal of the frame of radar signals is a frequency-modulated continuous-wave (FMCW) signal that increases in frequency over time, and wherein a starting frequency of each respective signal of the frame of radar signals beginning with a second signal of the frame of radar signals has a starting frequency offset by a frequency shift ($\Delta F$) determined according to: $F = \Delta D * S$, where S is a system parameter representing a slope of the respective radar signal of the frame of radar signals.

16. A system, comprising:
a first radar device configured to transmit a frame of radar signals, each signal of the frame of radar signals increasing in frequency over time, wherein a starting frequency of each respective signal of the frame of radar signals beginning with a second signal of the frame of radar signals has a starting frequency offset by a frequency shift ($\Delta F$); and
a second radar device configured to:
receive a frame of reflected signals, the frame of reflected signals corresponding to the frame of radar signals reflected off a target; and
sample the reflected signals in a set of sampling windows, each sampling window of the set of sampling windows corresponding to one respective reflected signal of the frame of reflected signals, wherein each successive sampling window of the set of sampling windows beginning with a second sampling window of the set of sampling windows is shifted in time by a time shift ($\Delta D$).

17. The system of claim 16, wherein the time shift ($\Delta D$) is determined according to: $\Delta D = ppm*1e-6*P_{signal}$, where ppm is a parts per million (ppm) offset between the first radar device and the second radar device, and $P_{signal}$ is a signal repetition period of the set of radar signal reflections, and wherein the frequency shift ($\mu F$) is determined according to: $F = \Delta D * S$, where S is a system parameter representing a slope of the respective reflected signal of the frame of reflected signals.

18. The system of claim 17, wherein to determine the time shift and the frequency shift, the first and second radar devices are configured to perform a calibration operation that comprises:
transmitting, by the first radar device, a calibration radar signal at a first local oscillator (LO) frequency;
receiving, by the second radar device at a second LO frequency offset from the first LO frequency by a target offset, a reflection of the calibration radar signal;
determining, by the second radar device, an intermediate frequency (IF) of the reflection of the calibration radar signal based on the first LO frequency and the second LO frequency; and
determining, by the second radar device, the ppm offset between the first device and the second device based on the intermediate frequency and the target offset.

19. The system of claim 18, wherein the second radar device is configured to determine the ppm offset according to: $1e6*(F_{IF}-F_{offset})/F_{RF}$, where $F_{IF}$ is a peak frequency of the intermediate frequency, $F_{offset}$ is the target offset, and $F_{RF}$ is the first LO frequency.

20. The system of claim 16, wherein the second radar device is configured to combine data of the sampled reflected signals with data of sampled second reflected signals, the second reflected signals resulting from a second frame of radar signals transmitted by the second radar device.

* * * * *